United States Patent [19]
Pacela

[11] 3,871,359
[45] Mar. 18, 1975

[54] IMPEDANCE MEASURING SYSTEM
[75] Inventor: Allan F. Pacela, Diamond Bar, Calif.
[73] Assignee: Interscience Technology Corporation, City of Industry, Calif.
[22] Filed: June 25, 1973
[21] Appl. No.: 373,435

[52] U.S. Cl.............................. 128/2.1 Z, 324/65 R
[51] Int. Cl............................................... A61b 5/05
[58] Field of Search......... 128/2.1 Z, 2.1 R; 324/62, 324/63, 64, 65 R

[56] References Cited
UNITED STATES PATENTS

| | | | |
|---|---|---|---|
| 3,149,627 | 9/1964 | Bagno | 128/2.1 Z |
| 3,302,106 | 1/1967 | Shaw | 324/62 R |
| 3,303,418 | 2/1967 | Rose | 324/64 |
| 3,340,867 | 9/1967 | Kucibek et al. | 128/2.1 Z |
| 3,347,223 | 10/1967 | Pacela | 128/2.1 Z |
| 3,452,743 | 7/1969 | Rieke | 128/2.1 Z |
| 3,665,302 | 5/1972 | Lees et al. | 324/64 |
| 3,730,171 | 5/1973 | Namon | 128/2.1 Z |
| 3,742,936 | 7/1973 | Blanie et al. | 128/2.1 Z |

OTHER PUBLICATIONS

NASA Technical Brief, "New Elec. Impedance Plethysmograph Monitors Cardiac Output," June, 1968, Brief 68-10,220.

Primary Examiner—Richard A. Gaudet
Assistant Examiner—Lee S. Cohen
Attorney, Agent, or Firm—Raymond L. Madsen

[57] ABSTRACT

There is disclosed a constant magnitude alternating current source connected to at least one electrical impedance to be measured. First and second voltage detectors are connected to the electrical impedance to measure voltage across first and second portions of the electrical impedance, respectively, in response to the current conducted from the current source. A computer is attached to the first and second voltage detectors for processing the measured voltage to compute desired characteristics of the electrical impedance.

7 Claims, 6 Drawing Figures

IMPEDANCE MEASURING SYSTEM

THE DISCLOSURE

The present invention relates to electrical impedance measuring apparatus and more particularly to a bilateral impedance plethysmograph.

In the field of electrical impedance measurements, it has been the general practice to employ measuring instruments having no capability of processing or operating upon the measured information obtained to derive useful relative or normalized impedance characteristics. Although such devices have served the purpose, they have not proved entirely satisfactory under all conditions of service for the reason that considerable difficulty has been experienced in deriving useful information from the impedance measurements and in obtainng this information quickly without the tedious and timely task of further processing and calculation. The present invention overcomes this difficulty.

In the field of medicine and biology, it has been recognized that the volume or changes of living subjects is reflected in steady-state or changing bioelectrical impedance parameters. To measure these parameters it has been the general practice to employ (i) impedance plethylsmographs to monitor respiration; (ii) rheoencephalographs to record cerebral blood flow, and (iii) impedance rheographs to study blood circulation in various parts of a living subject. Although such devices have served the purpose, they have not proved entirely satisfactory under all conditions of service for the reason that they provide only unilateral (single) impedance measurements and considerable difficulty has been experienced in extending these unilateral impedance measurements to the simultaneous measurement of dual impedances in a living subject.

Those concerned with the development of impedance plethysmographs have long recognized the need for a device that simultaneously measures two symmetrical portions of living subjects. The present invention fulfills this need.

The present invention is a bilateral (dual) impedance plethysmograph designed for the simultaneous bilateral impedance measurement or monitoring of arterial blood flow or venous blood volume in the limbs; for screening to detect arterial or venous disease and venous thrombosis, occlusion, or obstruction; for the bilateral monitoring of thoracic impedance related to individual lung respiration of thoracic fluid accumulation; and for the bilateral monitoring of blood flow in symmetrical organs such as the kidneys or lungs, and overcomes the problems of the unilateral devices.

There are many well known and established methods for the electrical measurement or monitoring biolelectrical impedances of living subjects. These have included electronic impedance bridges, modulated oscillators, Thevenin equivalent sources (voltage dividers, constant voltage sources, or constant current sources), and impedance component measuring systems. The electrode systems utilized have been two electrode (bipolar) designs and four electrode (tetrapolar) systems. Measurements have been made at frequencies from d.c. through 100 KHz. Typically, the current employed to measure bioelectrical impedance is an alternating, sinusoidal current in the range of 10 to 100 KHz. Direct current and low frequency alternating currents are only infrequently used due to the possibility of electrical stimulation of the living subject and the increased hazard of an electrical shock.

Although impedance bridge measuring systems allow the separation of the reactive and resistive components of the impedance being measured, their application has usually been in research where the necessity for manual balancing adjustments can be tolerated. Modulated oscillator systems have often been used to design low cost or miniturized instruments, but such designs usually result in nonlinear systems that are difficult or impossible to calibrate, thus leading to questionable measurements and limited applications. Of the Thevenin equivalent types of impedance systems, the constant current approach has been the most popular for clinical applications due to the absence of balancing adjustments. The present invention uses a constant magnitude alternating current source for conduction through the impedances to be measured.

One of the most critical problems confronting designers of impedance polyethylsmographs has been converting the impedance measurements from an absolute measurement to one which is relative foir the subject being measured. Absolute measurements have variations and magnitudes which are peculiar to the subject being measured and often times obscure the meaningful subject being measured and often times obscure the meaningful characteristics of the impedance measured. Impedance ratios or percent changes in a given subject impedance are more useful and eliminate the steady-state effects which are of little interest. The present invention provides an impedance ratio or percent change indication.

The general purpose of this invention is to provide an impedance plethysmograph which embraces all the advantages of similarly employed biological impedance measuring devices and possesses none of the aforedescribed disadvantages. To attain this, the present invention contemplates a unique dual channel or bilateral voltage measurement across two impedances or two portions of one impedance in response to a single constant magnitude alternating current whereby successive or repeated measurements and complicated data processing are eliminated and greater speed and accuracy are achieved along with the provision of information in a form which has greater clinical and research value.

An object of the present invention is the provision of a dual impedance measuring system which simultaneously measures two impedances and computes relative characteristics of these impedances.

Another object is to provide an impedance plethysmograph which simultaneously measures the impedance of two symmetrical tissue volumes of living subjects.

Still another object is to provide the computation of the fractional change of impedance of the tissue structure of a living subject.

A further object of the invention is the provision of a bilateral impedance rheograph which simultaneouslly measures the impedance of the tissue volumes of the limbs of a living subject and computes the percentage change in these impedances due to arterial and venous blood flow.

Other objects and many of the attendant advantages of this invention will be readily appreciated as the same becomes better understood by reference to the following detailed description when considered in connection with the accompanying drawings in which like reference numerals designate like parts throughout the figures thereof, and wherein.

Figure 1:
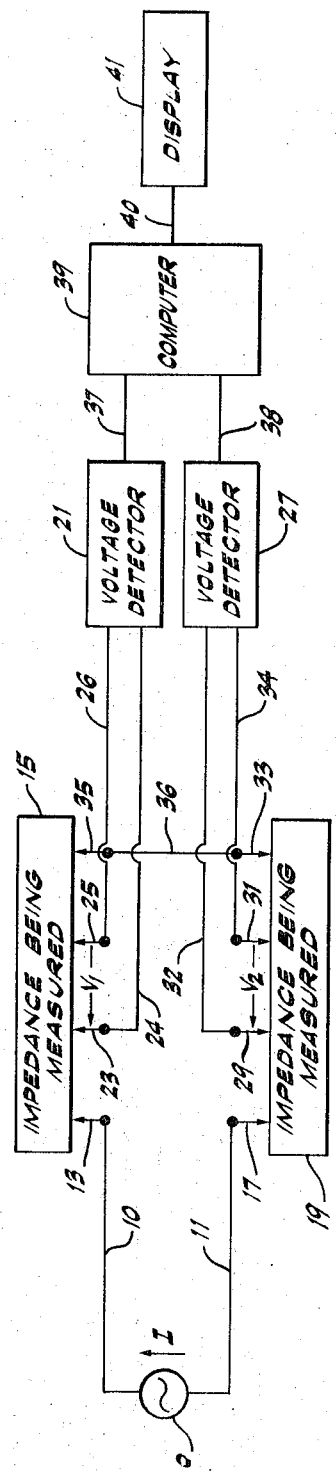
FIG. 1 illustrates a schematic block diagram of a preferred embodiment of the invention.

Referring now to the drawings wherein like reference characters designate like or corresponding parts throughout the several views, there is shown in FIG. 1 (which illustrates a preferred embodiment) a constant magnitude alternating current source 9, having an alternating current of magnitude I, which in turn is connected by lead 10 through electrode 13 to impedance 15 and through lead 11 and electrode 17 to impedance 19. Impedance 15 and 19 are the unknown impedances being measured. Voltage detector 21 is connected through leads 24 and 26 to electrodes 23 and 25, respectively, which in turn are connected to a portion of impedance 15. A voltage $V_1$ is shown to exist between electrodes 23 and 25 due to the conduction of current from constant current source 9 through impedance 15. Voltage detector 27 is connected through leads 32 and 34 to electrodes 29 and 31, respectively, which in turn are connected to a portion of impedance 19. A voltage $V_2$ is shown to exist between electrodes 29 and 31 in response to the conduction of current from constant current source 9 through impedance 19. Electrode 35 connects to impedance 15 and is further connected through lead 36 to contact 33 which in turn is connected to impedance 19, to provide a path for the conduction of current from impedance 15 to impedance 19 thereby completing the circuit for the conduction of current from constant current source 9. The output of voltage detector 21 is connected through line 37 to computer 39 and similarly the output of voltage detector 27 is connected through line 38 to computer 39. Computer 39 is connected through line 40 to display 41.

Voltage detectors 21 and 27 are of the type which are responsive to both magnitude and phase of the voltage waveform. This type of detector is well known to electronic designers and is often termed a synchronous detector. Therefore, the resistive and reactive components of impedance can be determined in addition to impedance magnitude. However, it should be clear that in many cases impedance magnitude is sufficient and it is contemplated within the scope of the present invention to include voltage magnitude detectors without phase indicating capability. This latter type can be the single diode rectifier well known to the electronic circuit designer.

Computer 39 is of the type commonly known as the instrument or general purpose computer, It has the capability of addition, subtraction and division. These computers are well known in the field of scientific measurement. It is also contemplated to utilize analogue computers in the form of ratio amplifiers, summing and differencing amplifiers, and other specific single purpose computing circuits which perform one mathematical function including the computation of the ratio of dynamic changes in voltage of current to steady-state valves of voltage or current.

Figure 2:
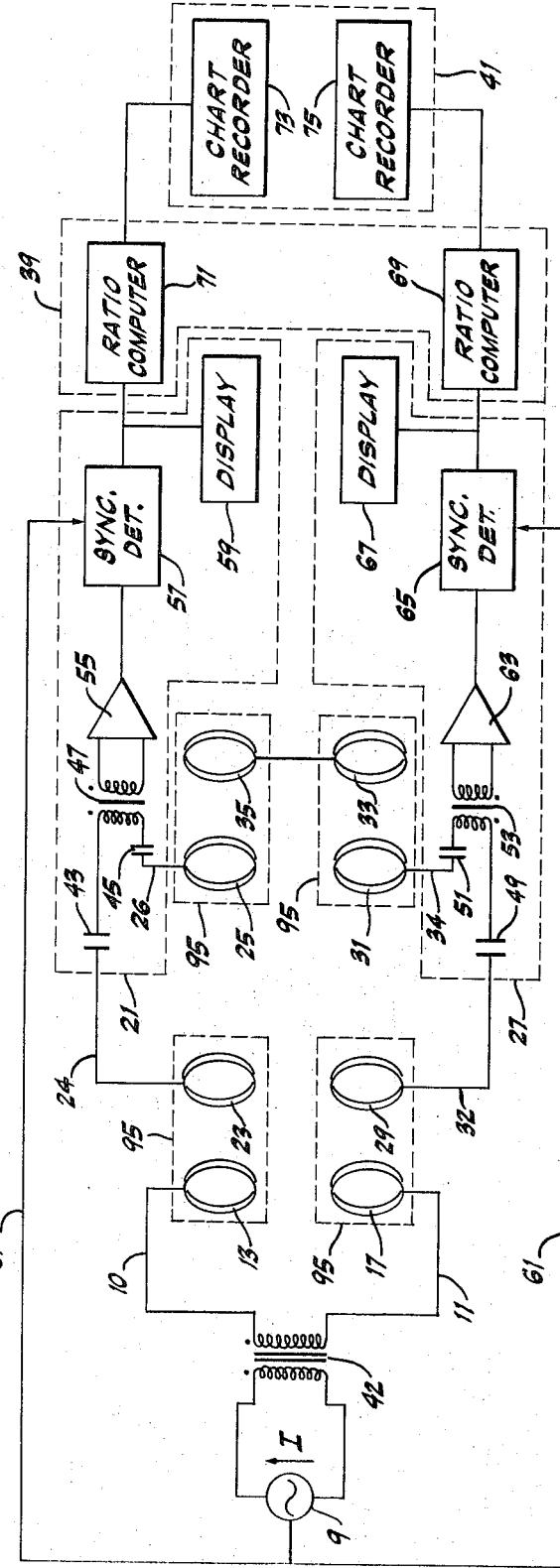
FIG. 2 shows a schematic block diagram of the invention including a ratio computer and four pairs of electrode strips or bands applied to the bilateral measurement of impedance of the limbs of a living subject.

FIG. 2 illustrates a detailed circuit block diagram showing the application of the circuit of FIG. 1 to a bilateral impedance rheograph where constant current source 9 is connected through isolation transformer 42 and lines 10 and 11 to electrodes 13 and 17, respectively. Electrodes 13 and 17 are illustrated as circular conductive strips each wrapped around and making electrical connection to similar points on opposite limbs of a living subject. Electrode 23 is similarly wrapped around and makes electrical contact with the same limb as electrode 13 and is located adjacent electrode 13 to form electrode pair 95. Electrode 23 is connected through line 24 and through capacitor 43 to one side of the primary of transformer 47. The other side of the primary of transformer 43 is coinnected through capacitor 45 to electrode 25 also wrapped around and making electrical contact with another part of the limb of which electrodes 13 and 23 are connected. Similarly, electrode 29, which is a wrap-around electrode identical to electrode 17, is located adjacent electrode 17 and is connected by line 32 to capacitor 49 which in turn is connected to one side of the primary of transformer 53, the other side of the primary of transformer 53 being connected through capacitor 51 to wrap-around electrode 31. Electrodes 17 and 29 comprise an electrode pair 95 identical to electrodes 13 and 23. Electrode 35 is wrapped around one limb adjacent electrode 25 and electrode 33 is wrapped around the other limb adjacent electrode 31. Electrodes 25 and 35 and electrodes 31 and 33 each form an electrode pair 95 identical to the other electrode pairs.

Figure 3:
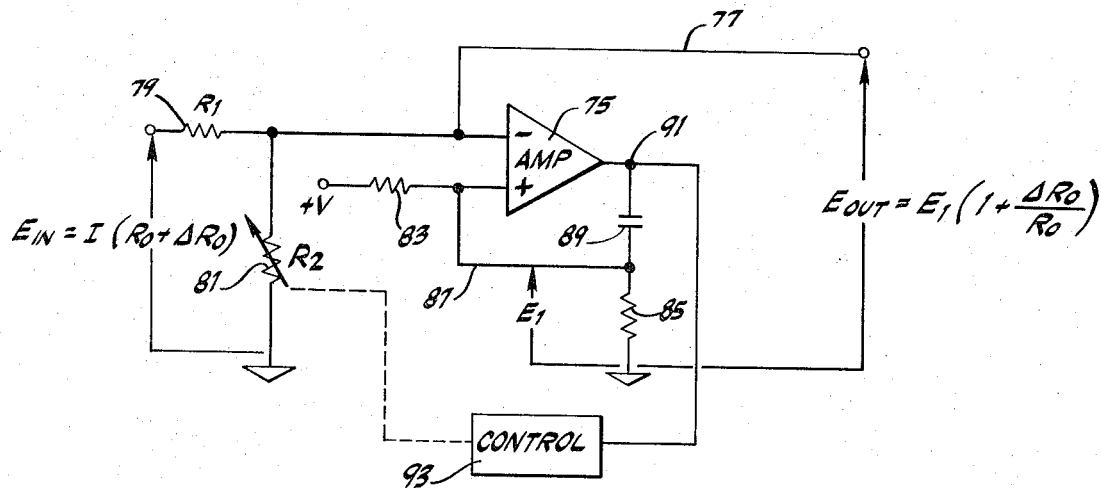
FIG. 3 illustrates a circuit diagram of the ratio computer shown in FIG. 2.

Secondary winding of transformer 47 is connected to amplifier 55 which in turn is connected to synchronous detector 57. The output of synchronous detector 57 is connected to display 59 which may be a continuous movement voltmeter or a digitall voltmeter display. The secondary of transformer 53 similarly is connected to amplifier 63 which in turn is connected to synchronous detector 65. The output of synchronous detector 65 is connected to display 67 which is identical to display 59. The output of synchronous detector 65 is further connected to ratio computer 69 and similarly synchronous detector 57 is connected to ratio computer 71. Ratio computer 69 and 71 are of the type which divide a dynamic change of the input signal by the steady-state value of that input signal. An electronic circuit which performs this function is illustrated in FIG. 3. The output of ratio computer 71 is connected to a chart recorder 73 and, similarly, the output of ratio computer 69 is connected to chart recorder 75.

Figure 4:
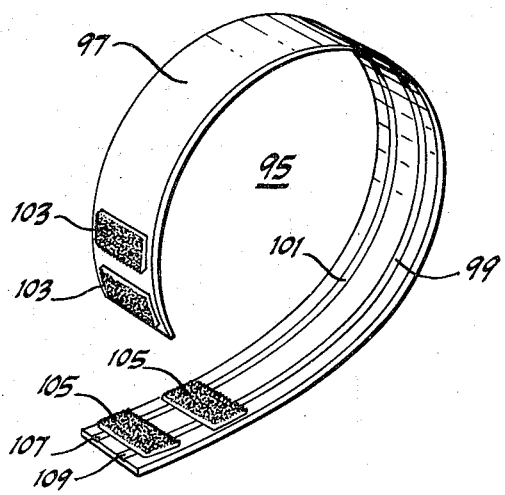
FIG. 4 shows a pictorial view of one of the electrode bands comprising a pair of electrode strips utilized in FIG. 2 to make contact to the limbs of a living subject.

It should be pointed out that electrode pairs 13/23, 17/29, 25/35, and 31/33 are of the type illustrated in FIG. 4. It should also be clear that capacitors 49 and 51, transformer 53, amplifier 63, synchronous detector 65, and display 67 comprise voltage detector 27 of FIG. 1. Similarly, capacitors 43 and 45, transformer 47, amplifier 55, synchronous detector 57, and display 59 comprise voltage detector 21 of FIG. 1. Ratio computers 69 and 71 comprise computer 39 of FIG. 1.

Synchronous detectors 57 and 65 are of the type which are controlled by an external signal. As illustrated in FIG. 2, line 61 is connected to constant current source 9 and is connected to each of the synchronous detectors 57 and 65 to provide a reference control signal. The signal present on line 61 renders the synchronous detector alternately conductive and nonconductive on either a half wave or full wave basis such that the output voltage of the synchronous detector is proportional to phase of the input signal to the synchronous detector relative to the reference signal applied to control the switching of the synchronous detector. For example, if the phase of the input signal is 90° out of phase with the reference signal, no output will occur, and if the signal is in phase, a maximum output will be provided.

Turning now to FIG. 3 there is illustrated a circuit diagram of ratio computers 71 and 69 shown in FIG. 2. An input voltage, which is proportional to the current I from the constant magnitude alternating current source 9 multiplied by an impedance $(R_0+\Delta R_0)$ across which the voltage is measured, is applied between one end of resistor 79 designated as $R_1$, the other end of resistor 79 being connected to one end of variable resistor 81, designated as $R_2$, and inverting input 77 to amplifier 75. $R_0$ is the steady-state value of the impedance and $\Delta R_0$ is the dynamic change in that impedance. The other end of variable resistor 81 is connected to ground. The non-inverting input to amplifier 75 is connected through resistor 83 to a source of d.c. voltage +V and is also connected through line 87 to the junction of resistor 85 and capacitor 89. The other end of resistor 85 is connected to ground and the other end of capacitor 89 is connected to the output 91 of amplifier 75. Output 91 is further connected to control 93 which in turn adjusts the resistance of variable resistor 81. Control 93 may be a servomotor connected to mechanically rotate the variable arm of variable resistor 81. Alternatively, variable resistor 81 may be a photoresistor and control 93 may be a lamp which illuminates photoresistor 81 and controls the resistance accordingly. The output voltage of the ratio computer is measured between line 77 and circuit ground is proportional to the voltage $E_1$ which exists between the non-inverting input to amplifier 75 and circuit ground multiplied by $[1+(\Delta R_0/R_0)]$. Capacitor 89 acts as a conducting path to connect the output to the non-inverting input of amplifier 75 for all signals representing dynamic changes. This causes line 77 to follow the dynamic change $\Delta R_0/R_0$ only and to provide the desired ratio computation.

FIG. 4 illustrates electrode pair 95. A flexible base member 97 made of a material such as mylar has metallic strips 99 and 101 such as aluminum bonded to one surface thereof. On one end of the base member opposite the side to which the aluminum strips are bonded are located connecting areas 103. On the other end of the base member and on the side to which the aluminum strips are bonded are located connecting areas 105 which mate with and connect to areas 103. Connecting areas 103 and 105 may be adhesive substances or alternately may be of the type used as garment closures consisting of multiplicity of tiny hooks which when the surfaces are pressed together engage one another to prevent the surfaces from being pulled apart except under force. The end of the electrode band is extended to provide terminals 107 and 109 for making contact to conducting leads for connection to an electrical circuit.

Figure 5:
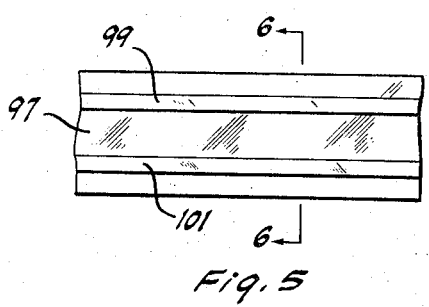
FIG. 5 illustrates a view in section of the electrode band of FIG. 4.

FIG. 5 shows a section of electrode pair 95 of FIG. 4 further illustrating the parallel nature of aluminum strips 99 and 101 bonded on flexible base member 97.

Figure 6:
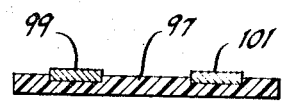
FIG. 6 shows a cross section view of the electrode band illustrated in FIG. 5.

FIG. 6 illustrates a cross section view of the electrode section illustrated in FIG. 5 taken through section 6—6. In the preferred embodiment of the electrode pair, aluminum strips 99 and 101 are bonded to a flexible mylar base 97 by heat and pressure. FIG. 6 illustrates aluminum strips 99 and 101 partially imbedded in the mylar base 97 by this process. The thickness of the aluminum strips 99 and 101 is small compared to the thickness of mylar base so that as mylar base 97 is flexed to the thickness of mylar base so that as mylar base 97 is flexed to clamp around the limb of a living subject, the aluminum strips 99 and 101 do not wrinkle or separate from the base due to compressive or tensile forces that may be exerted thereon.

Operation of the invention can best be understood by referring to FIG. 1. Constant magnitude alternating current source 9 supplies current through impedances 15 and 19. Between contacts 23 and 25 connected to impedance 15 a voltage $V_1$ is measured in response to the current flow in impedance 15. Current is applied to impedance 15 through electrodes 13 and 35 while voltage is measured between electrodes 23 and 25. When more than two electrodes are used, the impedance measured involves a ratio of voltage and current at two different pairs of terminals and is termed "mutual impedance." The most common mutual impedance system is the four electrode or "tetrapolar" system. The four electrode system is superior to other electrode systems in that it eliminates contact resistance effects between the electrodes and the body of a living subject being measured. This contact resistance is variable with the motion of the subject and creates motion artifacts which interfere with measurement of electrical parameters of the body. By applying the current to the subject through one pair of electrodes and measuring voltage through another pair of electrodes, the contact resistance and the inherent voltage drop thereacross is eliminated from the voltage measurement.

The voltage $V_1$ measured between electrodes 23 and 25 is an alternating voltage produced in response to the current from the constant magnitude alternating current source 9. Voltage detector 21 can be of the type which not only detects the magnitude of the alternating voltage, but the phase relation between the alternating voltage and the alternating current producing that voltage. Therefore, it is possible to not only measure the magnitude of the impedance, but to also measure the resistance and the reactive components thereof. The synchronous detector, as utilized in FIG. 2, is a voltage detector of this type and is well known to designers of electronic circuitry.

Similarly, voltage detector 27 detects the voltage which is produced between electrodes 29 and 31 in response to the current flowing from constant current source 9. Although two voltage measuring channels are illustrated, it is clear that one channel could be utilized where applicable, or that more than two channels may be utilized, depending upon the character of the impedance being measured. The voltages thus measured, are directed into computer 39 which may be a general purpose computer or one which has specific electronic circuitry to perform various mathematical operations upon the voltage input information. A typical mathematical operation contemplated within the scope of this invention is the division of one voltage by another. General purpose computers are well known in the electronic field as well as specific ratio and dividing circuits. It is contemplated within the present invention to divide the voltage measured across one impedance by the voltage measured across another impedance to compute a comparative ratio. Another operation contemplated is the computation of the dynamic change of one voltage measurement divided by the steady-state value of that voltage to compute a fractional or percent change. Still another computation contemplated is the difference between dynamic voltage changes across two or more impedances divided by the sum of the steady-state values of those impedances. The usefulness of ratio computations to provide "normalized" information is well known in the field of electrical parameter measurements. By providing ratio computations, those effects which produce changes in the dynamic impedances as well as steady-state impedances is eliminated.

The results of the above computations are displayed on display unit 41 which may be a digital display, chart display, or a continuous meter movement type of display, all of which are well known in the art of electronic measurement.

The measurement of bioelectrical impedance or "bioimpedance" is particularly useful in the indirect measurement of regional bloodflow and cardiac output as well as in the indirect recording of respiratory tidal volume. Within the past decade, applications of bioimpedance measurement have rapidly multiplied and lead to the clinically useful arts of impedance plyethylsmography, impedance rheometry, impedance pneumography, and rheoencephalography. With the present invention, the applications of bioelectrical impedance measurement have been extended to the detection of arterial insufficiency and deep venous thrombosis.

All of the applications of bioelectrical impedance measurements are based on the conductive nature of tissue, and on the impedance changes that occur in tissue due to changes in blood flow, hematocrit, velocity, temperature, fluid volumes, ionic constituents, and geometric factors. Tissue resistivity is not usually homogeneous, isotropic, or linear. Nevertheless, it is useful to ascribe those characteristics to a small tissue volume in order to derive a useful model for the original of the impedance pulsations caused by blood flow. It is well known in the field of tissue impedance measurement that the volume fraction of blood to tissue is directly proportional to the fractional impedance change, and the constant of proportionality is a ratio of blood to tissue resistivities.

In a mathematical sense, the electrical impedance of tissue is complex and thus represented as a time varying vector quantity. It has been the practice in impedance plethysmography to measure the magnitude and change in magnitude of the impedance vector. Some researchers have measured the resistive or real part, or the reactive or imaginary part of the vector. The coordinate system chosen does not change the nature of the tissue impedance; and so, mathematically, the polar or cartesian representations are completely equivalent. The resistive and reactive measurements may be transformed to magnitude and phase, or vice versa, without loss of physiological information. It should be clear at this point that the synchronous detector of FIG. 2 used to detect voltage enables the measurement of the resistive or reactive components of the impedance or the magnitude of the impedance itself.

Since the bioelectrical impedance measurement involves the application of a current to the subject, the question of safety immediately arises. The use of high frequencies, usually in the range of 50 KHz to 100 KHz at both very low current levels and low current densities eliminates this problem.

The circuit illustrated in FIG. 2 is particularly applicable to the measurement of bioimpedances for the detection of peripheral vascular disease which broadly applies to any disease of the blood vessels outside of the heart, as well as to diseases of the lymph vessels. Four electrodes are affixed to each of opposite limbs, for example, the legs and simultaneous bilateral measurements are made. Electrode pair 13 and 23 are applied to one location on a given limb and electrode pair 25 and 35 are attached to a different location on the same limb. Similarly electrode pair 17 and 29 and pair 31 and 33 are located symmetrically opposite on the other limb. The aluminum strips make contact to the skin of the subject through an electrode paste applied to the skin of the patient or to the electrode band itself.

Transformers 42, 47, and 53 isolate the subject from a potential electrical hazard which could be produced by the patient coming in contact with a ground or other external source of voltage. The transformers are designed to transmit the high frequencies associated with the contant magnitude alternating current source 9 but will not conduct 60 cycles or the more common sources of high voltage in current which could be hazardous to the subject.

The alternating voltages from transformers 47 and 53, which are proportional to the impedances between the corresponding electrodes, are coupled to voltage amplifiers 55 and 63, respectively, and detected by synchronous detectors 57 and 65. Capacitors 43 and 45 and 49 and 51 serve to block any d.c. conduction which may interfere with other physiological measurements being performed on the subject. In addition, the capacitors and the transformer may be selected to "tune" the circuit reactances associated with the transformer and the capacitors to obtain a particularly desired frequency response.

The steady-state, or "basal" resistance is indicated for each limb on displays 59 and 67, respectively. Typical values of basal resistance fall into the range of 40 to 60 ohms for measurements made on the legs. The displays can be of the digital or of the analogue type.

The dynamic characteristics of impedance of interest are the venous responses and the arterial responses. To measure the impedance change for a venous measurement, the patient is instructed to make a maximal sustained inspiration for approximately 5 to 10 seconds or until the patient base line response ceases to change. This respiratory maneuver is repeated approximately three times and the largest response is selected. Ratio computers 69 and 71 compute the fractional or percentage change of the impedance due to this respiratory maneuver relative to the basal impedance for each limb of the subject being measured. A venous base line change of 0.20 percent or greater represents a normal venous system, while below 0.20 percent represents venous thrombosis or obstruction. The ratio computer illustrated in FIG. 3 automatically computes the ratio of the impedance dynamic change to the basal impedance.

Bilateral arterial studies can be performed by observing the magnitude of the impedance changes in response to each pulse of the heart which pumps blood to the limbs of the subject. Again, a ratio computation is utilized comparing the dynamic impedance change at each pulse of the heart with the basal impedance or steady-state value. Interpretation of relative arterial flow is generally described in terms of the amplitude of the pulses, the slope, and the area. The output of ratio computers 69 and 71 are respectively connected to chart recorders whee these factors are displayed for observation and analysis.

It is further contemplated in the present invention to provide a means of noise cancellation from the bilateral outputs of the impedance plethylsmograph. Since a single common constant magnitude alternating current source is used to generate the current flowing in each bilateral portion of the subject being measured, the electronic noise component applied to each segment as part of the exitation current is the same. To the extent that these noise signals are identical in the left and right channels, they may be cancelled by electronically subtracting the outputs of each of the channels. Such subtraction may be accomplished by a common differential ammplifier located after the voltage detectors and before the chart recorders. It should be noted also that such an operation is contemplated to be within the scope of the computer capability of computer 39 of FIG. 1.

An alternate method for cancellation of unwanted electronic noise involves the filtering of one output channel to eliminate the normal output signals and the subtraction of the filtered signal from either or both output channels. To the extent that left-to-right comparisons of physiologic responses are desirable, the differential subtraction of left and right signals can be performed with the additional benefit of noise cancellation.

The ratio computer illustrated in FIG. 3 operates on the principle of a controlled voltage divider circuit consisting of resistors $R_1$ and $R_2$. The input signal applied between $R_1$ and ground causes the input to amplifier 75 to change. Normally at balance, the input to amplifier 75 is substantially zero, there being voltage $E_1$ on the inverting input and voltage $E_1$ on the non-inverting input to the amplifier. When a signal appears that the input to the amplifier, the output 91 will change correspondingly to produce a signal to control 93 which changes the resistance of resistor $R_2$ in such a way to cause the input voltage to the inverting input to amplifier 75 to return to the original value of $E_1$. However, the dynamic changes are directly shorted by capacitor 89 such that the inverting input 77 follows the dynamic changes such that the voltage measured between the inverting input to amplifier 75 and ground is directly proportional to the fractional change in impedance which produced the input signal to the ratio computer initially.

It now should be apparent that the present invention provides a bilateral impedance plethysmograph which may be employed in conjunction with the measurement of biological tissue for the detectioon of deep venous thrombosis and peripheral vascular disease. The impedance plethylsmograph utilizes a ratio computation for the display of a normalized dynamic impedance which is insensitive to the basal impedance incurred from one measurement to the next.

Although particular components, etc., have been discussed in connection with a specific embodiment of an impedance plethysmdograph for application to bilateral impedance rheography, constructed in accordance with the teachings of the present invention, others may be utilized. Furthermore, it will be understood that although an exemplary embodiment of the present invention has been disclosed and discussed, other applications and circuit arrangements are possible and that the embodiments disclosed may be subject to various changes, modifications, and substitutions without necessarily departing from the spirit of the invention.

What is claimed is:

1. Impedance measuring apparatus for measuring first and second electrical impedances, comprising:
    current source means for producing an alternating current of constant magnitude;
    first and second voltage detector means for measuring voltages;
    first electrode pair means attached to said current source means and adapted to be connected between the first and second electrical impedances;
    second electrode pair means electrically connected together and adapted to be connected between said first and second electrical impedances to complete an electrical circuit comprising said current source means connected to the series combination of said first and second electrical impedances;
    third electrode pair means connected to the first voltage detector means and adapted to be connected across the first electrical impedance for measuring the voltage thereacross in response to said alternating current of said current source means;
    fourth electrode pair means connected to the second voltage detector means and adapted to be connected across said second electrical impedance for measuring the voltage thereacross in response to said alternating current of said current source;
    computer means connected to said first and second voltage detector means for computing the ratios of changes in the electrical impedance of said first and second electrical impedances to the steady-state value thereof, respectively; and
    display means for displaying said ratios computed by said computer means.

2. The impedance measuring apparatus described in claim 1 further including a plurality of isolation transformers, one transformer being connected between said current source means and said first electrode pair means, a second transformer being connected between said first voltage detector means and said third electrode pair means and a third transformer being connected between said second voltage detector means and said fourth electrode pair means, said transformers coupling electrical currents and voltages derived from said current source means and substantially isolating all other electrical currents and voltages which are not derived from said current source means.

3. The impedance measuring apparatus described in claim 1 wherein each of the electrode pair means comprises a pair of conductive strips and wherein said current source means is connected between a first conductive strip adapted to be wrapped around one limb of a living subject and a second conductive strip adapted to be wrapped around the same part of the opposite limb of said living subject, the first and second conductive strips being said first electrode pair means, and wherein said first voltage detector means is connected between a third conductive strip and a fourth conductive strip, said third conductive strip being adapted to be located adjacent said first conductive strip and said fourth conductive strip being adapted to be located at the other end of a region of said one limb being measured, the third and fourth conductive strips being said third electrode pair means, and wherein a fifth conductive strip is adapted to be located adjacent said fourth conductive strip and wherein said fifth conductive strip is connected to a sixth conductive strip adapted to be wrapped around at the same point on said opposite limb corresponding to said fifth conductive strip on said one limb, the fifth and sixth electrode strips being said second electrode pair means, and wherein said second voltage detector means is connected between a seventh conductive strip being adapted to be located adjacent said sixth conductive strip and said eighth conductive strip being adapted to be located adjacent said second conductive strip, the seventh and eighth conductive strips being said fourth electrode pair means.

4. The impedance measuring apparatus described in claim 3 further including a plurality of flexible base members, each having two adjacently located conductive strips attached thereto whereby four electrode pairs are formed, a first pair comprising the first and third conductive strips, a second pair comprising the fourth and fifth conductive strips, a third pair comprising the sixth and seventh conductive strips, and a fourth pair comprising the eighth and second conductive strips, each of said flexible base members having connecting areas thereon for attaching each of said base members to itself when wrapped around the limb of a living subject.

5. The impedance measuring apparatus described in claim 4 wherein said first voltage detector means and said second voltage detector means are synchronous detectors whereby both the magnitude and phase of the voltage measured can be detected.

6. The impedance measuring apparatus described in claim 1 wherein aid computer means is a pair of electronic circuits of which one is connected to said first voltage detector and one is connected to said second voltage detector, each electronic circuit including:

a first and second resistor connected in series between the output of the respective voltage detector and the circuit ground, said second resistor; and means for varying automatically said second resistor to maintain a constant voltage output thereacross irrespective of the value of the steady-state voltage applied to said first resistor from said respective voltage detector, said second resistor not being adjusted in response to dynamic changes in the voltage from said respective voltage detector whereby the voltage across said second resistor is proportional to the fractional change of the impedance being measured.

7. Bilateral impedance measuring apparatus comprising:

four pairs of electrodes, a first and second pair of said four pairs being adapted to be attached to a first impedance being measured and a third and a fourth pair of said four pairs being adapted to be attached to a second impedance being measured;

an alternating current source of constant magnitude attached between one electrode of the first pair of electrodes and one electrode of the fourth pair of electrodes;

a conductor attached between one electrode of the second pair of electrodes and one electrode of the third pair of electrodes;

a first and a second voltage detector, the first voltage detector being connected between the other electrode of said first pair and the other electrode of said second pair, the second voltage detector being connected between the other electrode of said third pair and the other electrode of said fourth pair;

computer means attached to the first and second voltage detectors for computing impedance ratios and impedance differences; and display means for displaying said impedance ratios and impedance differences.

* * * * *